Aug. 10, 1948.　　　　　O. G. KREER　　　　　2,446,935
AUTOMATIC ELECTRIC TOASTER
Filed July 5, 1944　　　　　　　　　　　　　　3 Sheets-Sheet 1
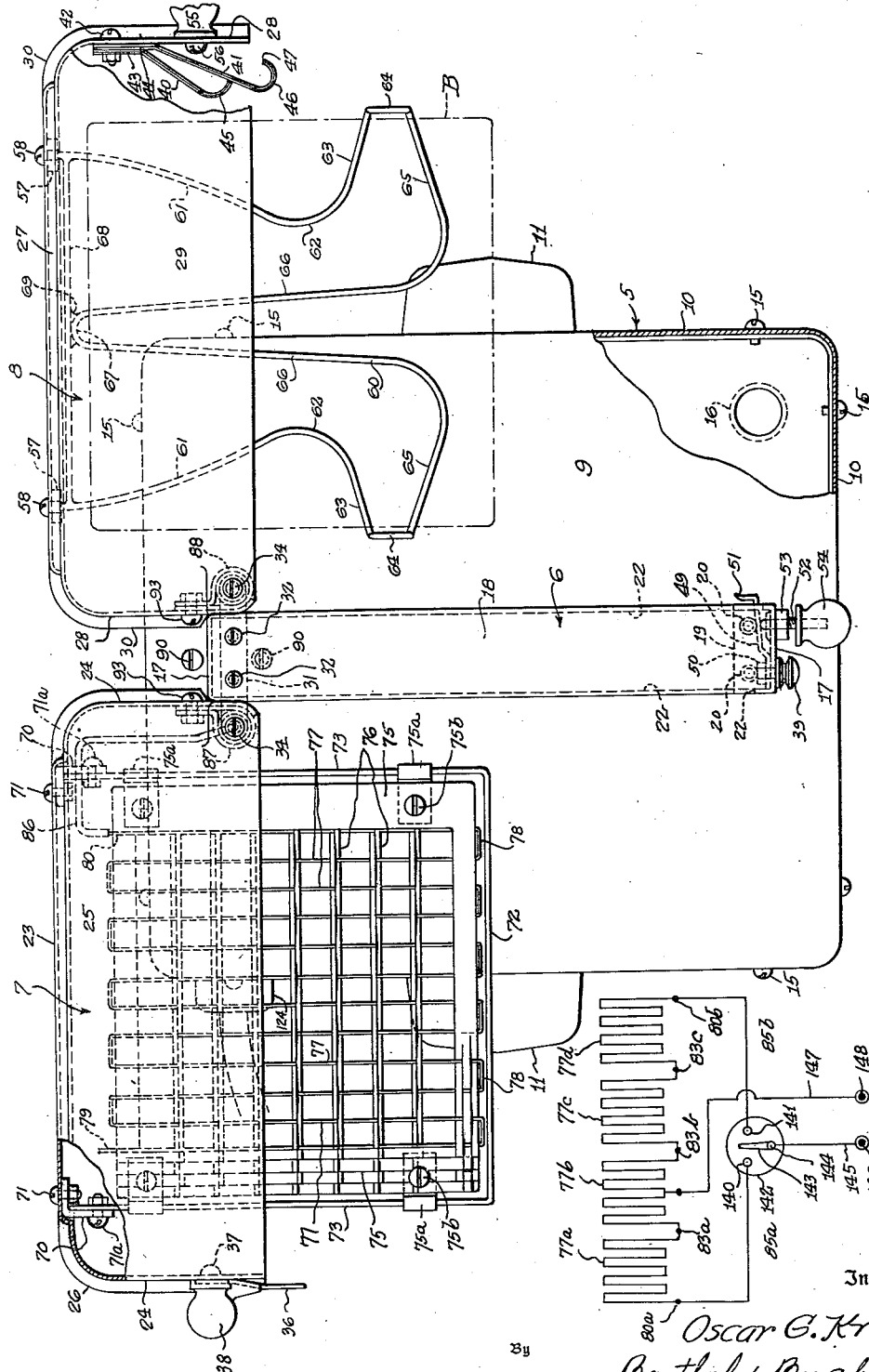
Inventor
Oscar G. Kreer
By Barthel + Bugbee
Attorneys

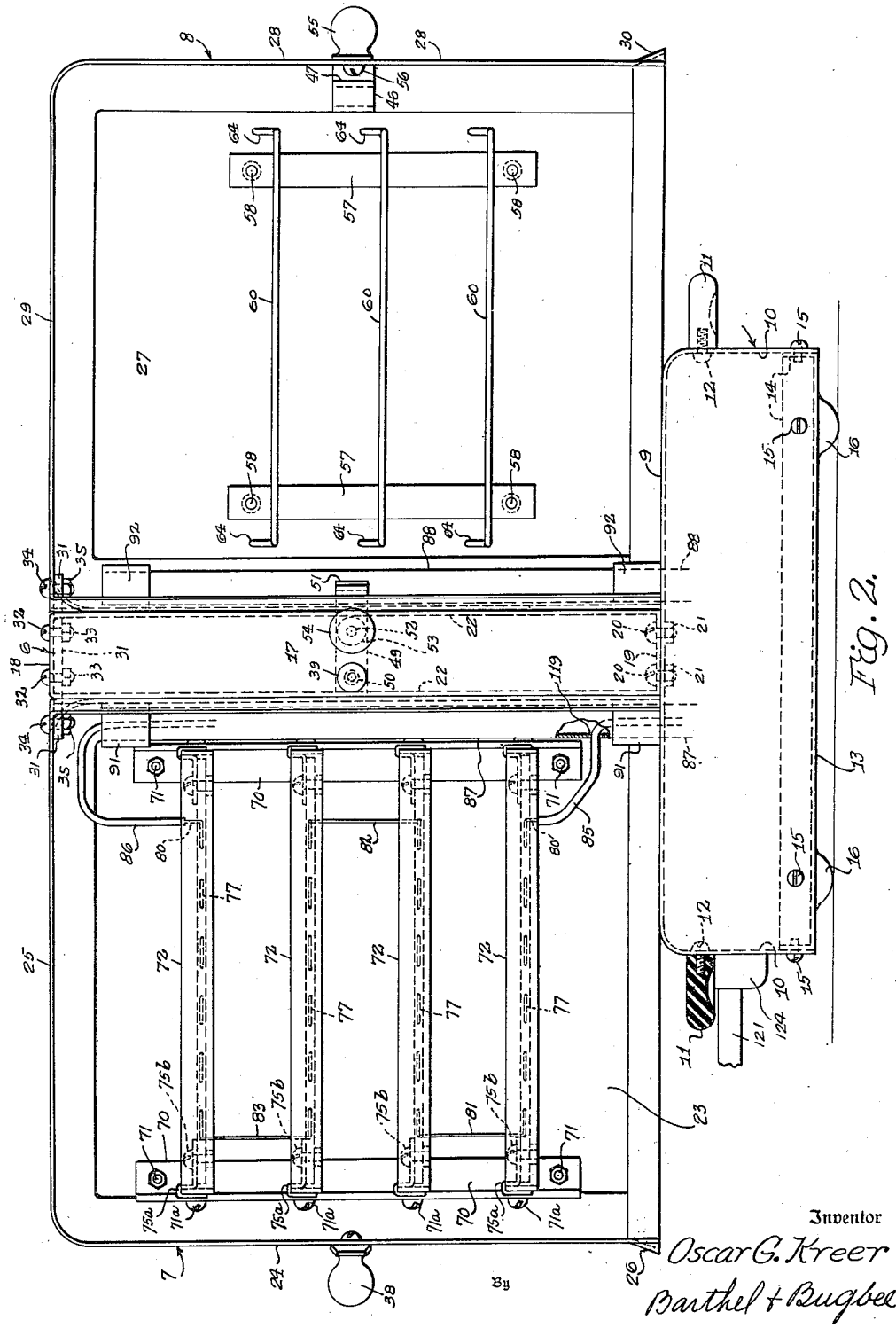

Aug. 10, 1948.                O. G. KREER                2,446,935
                        AUTOMATIC ELECTRIC TOASTER
Filed July 5, 1944                                 3 Sheets-Sheet 3
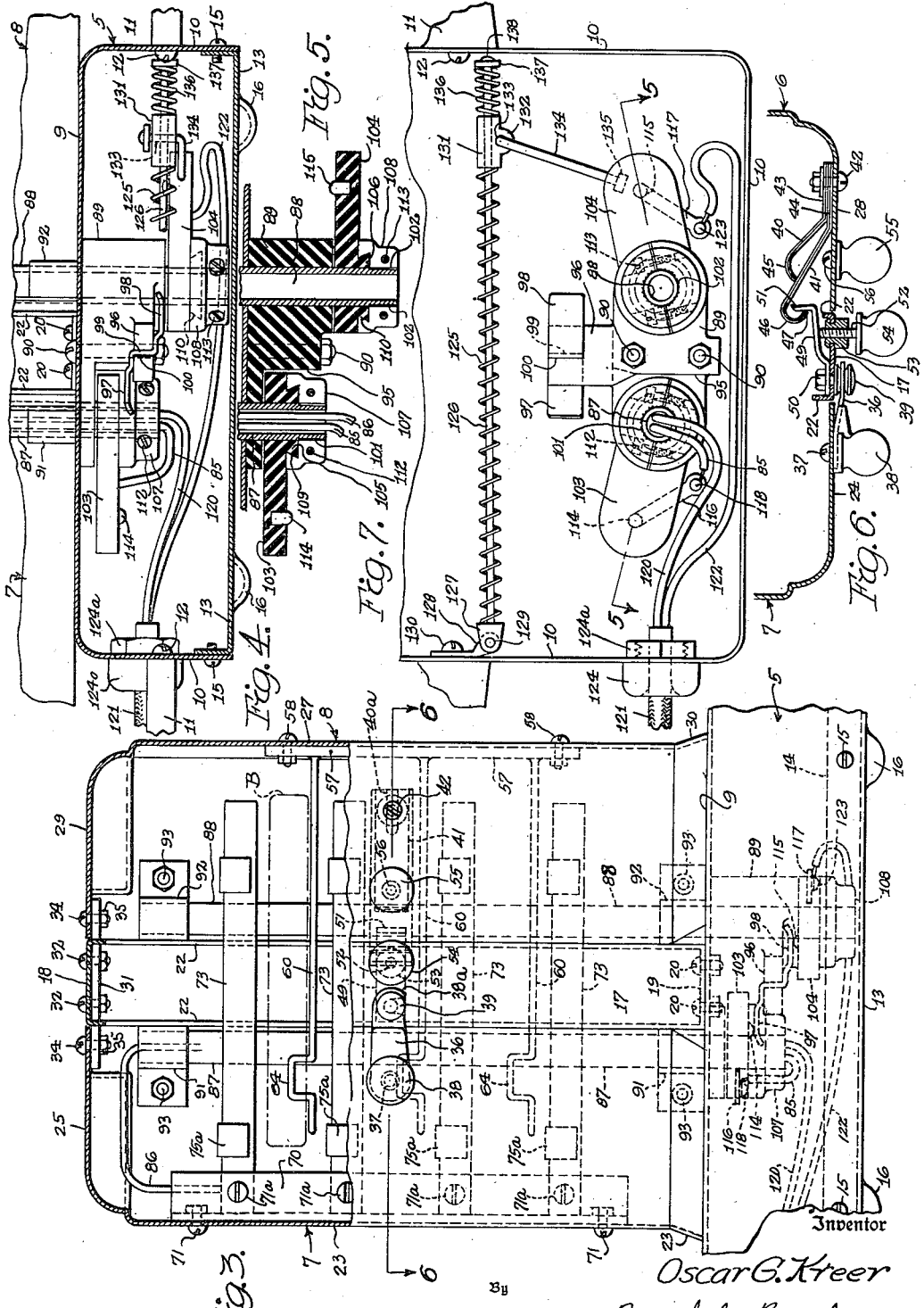
Inventor
Oscar G. Kreer
By Barthel & Bugbee
Attorneys Patented Aug. 10, 1948

2,446,935

UNITED STATES PATENT OFFICE 2,446,935

AUTOMATIC ELECTRIC TOASTER

Oscar G. Kreer, Detroit, Mich.

Application July 5, 1944, Serial No. 543,545

4 Claims. (Cl. 99—338)

The present invention relates to improvements in automatic toasters, and, more particularly, to a timing and controlling mechanism therefor.

The primary object of the invention is to provide an automatic toaster for toasting a plurality of slices of bread simultaneously and to provide means for delivering the bread after the lapse of a predetermined time interval and interrupting the circuit through the heating element at the moment of bread delivery.

Another object of the invention is to provide a temperature controlled latch member which is released after a predetermined time interval to deliver the slices of bread and to provide means for controlling the latch member to facilitate the toasting of the bread to the desired degree.

Another object of the invention is to provide a timing and control device for toasters of the automatic type including a bi-metalilc latch member for retaining the bread slice carrier in position so that upon bending and expansion of the bi-metallic element, said bread carrier will be moved to its open position to deliver the toast and upon opening of the bread slice carrier, an electric switch is operated to interrupt the circuit through the heating element of the toaster simultaneously with the release of the bi-metallic latch member.

Another object of the invention is to provide a toaster of the automatic type in which the heating elements are arranged so that they will not sag or become out of shape during constant use and are so positioned that the heat therefrom will be utilized to a maximum extent.

Another object of the invention is to provide a toaster of the automatic type in which the heating elements and bread slice carrier are arranged so that they may be easily swung to an open position on a vertical axis to facilitate the easy cleaning of the toaster and the removal of bread crumbs and the like from the casing as well as various portions of the heating element.

Another object of the invention is to provide an electric toaster of the automatic type which is comparatively simple in construction to enhance the mass manufacture thereof and which comprises comparatively few parts to become out of order and broken.

Another object of the invention is to provide an electric toaster of the automatic type which is designed to toast the bread slices to the desired degree of toasting with a minimum amount of electric power, thereby materially reducing the cost of operation and increasing the overall efficiency of the toaster.

Other objects and advantages of the invention will become apparent during the course of the following description of the accompanying drawings, wherein:

Figure 1 is a top plan view of the toaster showing the manner in which the heating element and bread slice carrier are mounted to swing horizontally on vertical hinge members and illustrating generally the structure and arrangement of the various parts;

Figure 2 is a front elevational view of the toaster showing the heating element and bread slice carriers in their open position and the general arrangement thereof, with the bread slice carriers staggered and positioned to be disposed adjacent pairs of heating elements so that the bread slices will be arranged in a horizontal position therebetween;

Figure 3 is a front elevational view of the toaster similar to Figure 2 showing the heating element carrier and bread slice carrier in their closed positions and illustrating the manner in which the slices of bread are disposed between adjacent pairs of heating elements for toasting;

Figure 4 is a vertical cross-sectional view through the base portion of the toaster and showing the remaining portions broken away to illustrate various structural details of the control switch for interrupting the circuit when the heating element carrier or the bread slice carriers are in an open position;

Figure 5 is a fragmentary cross sectional view of the switch structure illustrating in detail various features thereof and the positions of various parts;

Figure 6 is a horizontal fragmentary cross-sectional view taken on line 6—6 of Figure 3 looking in the direction of the arrows showing in detail the bi-metallic latch member and the adjustable keeper engageable thereby;

Figure 7 is a fragmentary horizontal cross sectional view through the base portion of the toaster further illustrating the electric switch for interrupting the circuit in the heating element and showing the yielding means for urging the bread slice carrier to the position shown in Figure 1 when the bi-metallic latch member is released from its keeper; and Figure 8 is a diagrammatic view of a modified form of the invention illustrating the heating elements connected to a source of current and provided with a switch for controlling the supply of current to certain of said heating elements when it is desired to toast single or double slices instead of a series or multiplicity of slices.

In the drawings attention is particularly directed to Figures 1 to 7 inclusive wherein there is shown a preferred embodiment of the invention including a base 5, frame supporting member 6 and hinged casing sections 7 and 8. The base 5 includes a top wall 9 having depending side walls 10 forming a rectangular housing of sturdy construction. Secured to opposed side walls 10 is a pair of handles 11 formed of Bakelite and held in place by screws or the like as at 12. The bottom wall of the base 5 includes a plate-like member 13 having a marginal flange 14 for being telescoped within the base 5 so as to be held therein by screws or the like as at 15. The bottom wall 13 is punched or depressed to form semi-spherical foot portions 16 adjacent the corners of the base so that the same may be supported on a table or the like without marring or scratching the table surface.

Secured to the top wall 9 of the base 5 is a rectangular frame structure which has been designated by the reference character 6 and said frame structure embodies a vertical upright 17 connected by a top wall 18 and provided with inwardly directed flanges 19 at the lower portions thereof. The flanges 19 are suitably apertured for receiving bolts or the like as at 20 so that nuts 21 may be threaded on the opposite end of said bolts to securely clamp the uprights 17 to the opposite wall 9 of the base 5. The uprights 17 and connecting portion 18 are provided with inwardly directed flanges 22 to strengthen the structure throughout and provide a relatively stable support for the hinge closure members 7 and 8 which will be hereinafter more fully described.

The closure 7 comprises a front wall 23 having a marginal flange extending around the sides and top thereof to provide side walls 24 and a top wall 25. The lower portions of the front wall 23 and side walls 24 are flared outwardly as at 26 and are adapted to slide over the top wall 9 of the base 5 when the closure 7 is moved to its open or closed position.

Similarly, the closure member 8 is comprised of a front wall 27 having a marginal flange extending around the edge thereof forming side walls 28 and a top wall 29. The lower portion of the front wall 27 and side walls 28 are flared outwardly as at 30 to provide a skirt portion which is adapted to slide over the top wall 9 of the base 5 in contactual engagement therewith and close the lower portion of said casing section 8 when the same is in a closed position.

Secured to the top wall 18 of the frame member 6 is a horizontal bar 31 which is adapted to project on opposite sides thereof and is held in place by bolts 32 being passed through suitable openings in the top wall 18 and spaced openings in the bar 31. Nuts 33 are threaded on the bolts 32. The free projecting ends of the horizontal bar 31 extend beneath the top walls 25 and 29 of the casing sections 7 and 8 and are affixed thereto by hinge bolts 34 passing through suitable apertures in said top walls 25 and 29 and secured in place by nuts 35 threaded on the lower ends thereof.

The free swinging end of the casing section 7 is provided with a latch member and said latch member includes a swinging bolt 36 pivoted to the side wall 24 by means of a screw or the like as at 37. A control knob 38 is affixed to the swinging bolt 36 to rotate the same so that the hooked end as at 38a may be moved into and out of engagement with a keeper pin 39 secured to the foremost vertical frame member 17. The other casing section 8 is provided with a bi-metallic latch member including bimetal strips 40 and 41 affixed to the side wall 28 of said casing section by means of a bolt 42 extending through an aperture therein with its free end passing through aligned openings in parallel portions 43 and 44 of said bimetal strips 40 and 41. The free ends of the bimetal strips 40 and 41 are slightly bent as at 45 and 46 respectively and the bent portion 45 of the bi-metal strip 40 is arranged in contactual engagement with the bi-metal strip 41 so as to provide a relatively stable structure while the free end of the bi-metal strip 41 terminates in a hook portion 47 as indicated in Figures 1 and 6. The bimetal strip 40 has a slotted end 40a to make necessary adjustments in relation to bi-metal strip 41 at bolt 42. The bimetal strips 40 and 41 are constructed and positioned so as to bend away from the side wall 28 of the casing section 8 when heated and said strips are each formed of metallic strips having different coefficients of expansion to facilitate the bending thereof in the proper direction when heated.

Held in place by the keeper pin 39 is an adjustable keeper bar 49 held in place by a nut or the like 50 on the threaded end of said keeper pin 39 and said keeper bar is formed of resilient spring metal and has its end 51 terminating in a keeper portion adapted to be engaged by the hooked end 47 of the bimetal strip 41. An adjusting screw 52 is threaded in a nut 53 secured to the front wall 17 of the frame structure 6 so that the inner end thereof will engage the flexible keeper 49 and move the keeper portion 51 thereof when the screw 52 is adjusted by the hand knob 54. The hand knob 54 is also secured to the side wall 28 of the casing section 8 and is held in place by a screw or the like as at 56 to facilitate closing of said casing section after the same has been automatically opened.

Carried by the casing section 8 is a series of bread slice holders and as shown in Figures 1 and 2, the bread slice holder is formed of a pair of spaced bar members 57 secured to the front wall 27 of the casing section 8 by screws or the like as at 58. A series of bread slice holders 60 are carried by the bars 57 and each of the bread slice holders includes a wire frame member having side portions 61 bent inwardly as at 62 and flared outwardly as at 63 where they are bent for a portion of their length as at 64 to provide upstanding bread slice engaging projections (Figure 1). Inwardly extending portions 65 terminate in substantially parallel portions 66 bent upon themselves as at 67 to complete the carrier structure. The side portions 61 are connected by a transverse bar 68 to which the return bent portion 67 is welded as at 69 and the ends of said side portions 61 are welded or otherwise secured to the spaced parallel bars 57 and are likewise welded to the transverse bar 68. Each of the bread slice holders 60 is of a sufficient size to support a slice of bread of domestic dimensions indicated by the reference character B. It will thus be seen that a series of bread slices may be positioned on the bread slice holders 60 in superposed spaced apart relation in such a manner that the bread slices B will swing horizontally with the casing section 8.

A plurality of electric heating elements are supported by the casing section 7 from the front wall 23 thereof and in order to support said heating elements in superposed relation in offset spaced locations or positions from the bread slice holder 60, a pair of small angle bars 70 are secured to the side wall 23 of the casing section 7 in spaced apart relation and held in place by nuts and bolts as at 71 at each end thereof. U-shaped frame members 72 have their leg portions 73 bolted at the ends thereof to the flanges of the angle bars 70 by means of nuts and bolts as at 71a so that said frame members 72 will project inwardly in staggered offset relation with respect to the bread slice carrier 69. Each heating element comprises an asbestos frame 75 which is rectangular in shape and is provided with a series of transversely arranged asbestos strips 76 with their ends fastened or looped to said asbestos frame 75 so that the heating element wire 77 may be interwoven to and fro between said transverse asbestos strips so as to hold the courses of said heating element wire in spaced relation (Figure 1). In order to hold said asbestos frames 75 in position in the U-shaped frame member 72, a series of metal clips 75a are passed therearound with the free ends thereof bolted or fastened in place by means of bolts 75b. The bolts pass through suitable openings in the asbestos frame adjacent the marginal edge thereof.

The loop ends of the high resistance heating element wires 77 and 78 pass through suitable openings in the rectangular frame 75 during the weaving of said high resistance heating element wire so that the terminal ends 79 and 80 will emerge from the frame 75 at a point adjacent the front wall 23 of the casing section 7. The lowermost heating element has its terminal 79 connected to the corresponding terminal of an adjacent heating element by means of a connecting portion 81 and the terminal portion 80 of said last-mentioned heating element is connected with the heating element terminal 80 immediately thereabove by means of a connecting portion 83 connecting the vertically aligned terminal point 79 thereof. The loose terminals 80 of the lowermost and uppermost heating elements are connected with the supply lines 85 and 86 respectively, and are adapted to be connected to a domestic source of current supply in a manner which will be hereinafter more fully described.

The casing sections 7 and 8 are additionally hinged and supported by a pair of vertically extending tubular pintle members 87 and 88 which have their lower ends journalled in a bearing block 89 formed of Bakelite or other insulating material affixed to the tap wall 9 of the base 5 by screws or bolts as at 90. The casing sections 7 and 8 are connected to the tubular pintle members 87 and 88 by means of clips 91 and 92 arranged at the top and bottom of said casing sections and said clips 91 and 92 encircle the tubular pintle members 87 and 88 and have their free ends fastened in place by nuts and bolts as at 93, to the respective rear walls 24 and 28 of said casing sections 7 and 8. It will thus be seen that the casing sections 7 and 8 may be swung horizontally on their vertical pivot points 34 and on the pintle members 87 and 88 so that the lower ends of said pintle members will rotate in suitable bearing openings in the bearing block 89.

The bearing block 89 is cut away as at 95 to form a stepped shoulder portion to facilitate the mounting of a pair of switch arms and formed integral with the bearing block 89 is a rearwardly extending projection 96 for supporting a pair of opposed switch contact members 97 and 98 which are connected by an intermediate portion 99 received in a longitudinal slot 100 in the rearwardly projecting extension 96 as illustrated in Figure 5. The intermediate portion 99 is firmly held or pressed into the slot 100 so that the stationary contacts 97 and 98 will be disposed on opposite sides of said rearwardly extending projection 96.

The lowermost ends of the tubular pintle shafts 87 and 88 are serrated as at 101 and 102 to facilitate the mounting of a pair of switch arms 103 and 104 on said pintle shaft and as illustrated in Figure 5, the switch arms 103 and 104 are provided with outwardly flared hub portions 105 and 106 of annular formation for receiving clamping collars 107 and 108 respectively. The clamping collars 107 and 108 are provided with complementary annular recesses 109 and 110 for receiving the outwardly flared hub portions 105 and 106 of said switch arms and said clamping collars are adapted to be clampingly held in engagement with the outwardly flared annular hub portions 109 and 110 and the serrated portions 101 and 102 of the pintle shafts 87 and 88 by means of clamping screws or bolts 112 and 113 respectively.

Imbedded in the free swinging ends of the switch arms 103 and 104 are contact members 114 and 115 positioned to engage the stationary contact members 97 and 98 respectively. Also imbedded in the switch arms 103 and 104 and connecting each of the contact pins 114 and 115 are connecting links 116 and 117 the outer free ends of which are adapted to be connected to one of the supply lines 85 which extends downwardly through the tubular pintle shaft 87 so that the lower end thereof may be connected as at 118 to said connector link 116. The other terminal conductor 85 is passed through a lateral opening 119 in the lower portion of the tubular pintle shaft 87 and passes downwardly through the base portion 5 so as to be connected to a lead line 120 of an electric cable 121. The other lead line 122 of said cable 121 is connected to the connector link 117 as at 123 so that a circuit will be completed through the electric heating element and low resistance heating wires thereof 77 when the switch contacts 114 and 115 are in engagement with the stationary contacts 97 and 98 respectively. The lead cables 120 and 122 are passed through an insulating bushing 124 in one of the walls 10 of the base 5 and said bushing is held in place by a suitable clamping nut 124a threaded on a reduced threaded portion of said insulator bushing. It will thus be seen that when the casing sections 7 and 8 are in their closed position, the switch arms 103 and 104 will be moved to a position to cause engagement of the contact pins 114 and 115 with their respective stationary contacts 97 and 98 and that it is necessary that both of said casing sections be closed before the circuit is completed through the domestic cable 121 which is connected to the house current supply and through the heating elements 77.

In order to yieldingly urge the casing section 8 in a normally open position, the tubular pintle shaft 88 is placed under tension by means of a coil spring 125 which encircles a guide rod 126 having a clevis at one end 127 for being pivotally connected to a bracket 128 as at 129. The bracket 128 is affixed to one of the walls 10 of the base 5 by means of a screw or the like 130. Slidably mounted on the rod 126 is a block 131 having a bearing projection 132 for receiving the upturned end 133 of a control rod 134. The other end of the control rod 134 is imbedded in the switch 104 as at 135. It will thus be seen that when the switch arm 104 and casing section 108 are moved to their closed position, the arm 134 will swing in a direction to compress the coil spring 125 by reason of the fact that the block 131 will move along the guide rod 126 toward the clevis end 127.

When the section casing 8 is closed and held in place by the heat responsive latch including the bimetal strips 40 and 41, the coil spring 125 is compressed so that the moment the heat responsive latch is released after a predetermined temperature has been reached, the closure will be yieldingly urged outwardly away from the casing section 7 and central frame portion 6. In order to absorb the shock of the outward movement of the casings 7 and 8, a coil spring 136 is placed on the free end of the guide rod 126 with one end in butting relationship with the slide block 131 and its other end in engagement with a stop collar or washer 137 held in place by the upset end of the rod 126 as at 138. It will thus be seen that when the casing section 8 has been released by the heat responsive latch including the bimetal strips 40 and 41, the spring 136 will cushion the closure 8 when it has reached the end of its swinging travel.

In the modified form of the invention, the heating elements 77a, 77b, 77c and 77d are connected in series as at 83a, 83b and 83c. The terminal ends 80a and 80b are connected by lead lines or wires 85a and 85b to the contacts 140 and 141 of the single pole double throw switch 142 so that the movable switch arm 143 thereof may be swung on its pivot 144 into engagement with either one of the contacts 140 or 141. A lead line or wire 145 connects the movable switch arm 143 with a terminal connection 146 which may be plugged into the domestic current supply system and a lead line 147 connects the other terminal 148 of said domestic current supply system with the intermediate portion of one of the electric heating elements 77b.

It is intended to incorporate the single pole double throw switch 142 in the circuit wiring of the automatic electric toaster shown in Figures 1 to 7 inclusive to facilitate the toasting of one slice of toast when the movable contact arm 143 is in engagement with the stationary contact 140 of the single pole double throw switch 143 and to enable the toasting of two slices of bread when the movable contact 143 is in engagement with the stationary contact 141 of the single pole double throw switch 142 which, as indicated in Figure 8, places a portion of the electric heating element 77b in series with the remaining electric heating elements 77c and 77d. In this position of switch arm movement, two slices of bread may be heated between the electric heating elements 77b, 77c and 77d.

Obviously, the single pole double throw switch 142 may be mounted on the base 5 in a convenient location to permit the toasting of one or two slices of bread as desired without necessitating the heating of all of the electric heating elements carried by the horizontally swinging casing section 7 and it is to be noted that the lead lines or wires 85a and 85b as well as the lead wire 147 may pass downwardly through the tubular pintle shaft 87 shown in the form of the invention in Figures 1 to 7 inclusive so that the lead wire 147 may be connected to one of the switch contacts 115 in Figures 1 to 7 inclusive while the lead wire 145 from the movable switch arm 143 may be connected to the other movable contact arm 114 on the switch arm 103 in the form of the invention shown in Figures 1 to 7 inclusive. In this construction, the domestic lead wires 120 and 122 of the cable 121 will connect to the connector links 116 and 117 as pointed out and described above.

In operation, the casing section is closed and latched in position by the manually controlled latch arm 36 being hooked over the latch pin 39. Several slices of bread B are then placed on the grill rack 60 and the section casing 8 of the toaster is then closed so as to permit the hooked end 47 of the heat responsive latch including the bimetal strips 40 and 41 to be engaged over the keeper projection 51 of the resilient keeper arm 49. With the section casings 7 and 8 thus closed, a toasting chamber is formed therebetween and the slices of bread B are passed between the heating element supporting frame 72 so as to be disposed in heat relationship therewith.

After the toasting chamber has reached a predetermined temperature so as to toast the slices of bread B to the desired degree, the heat responsive latch including the bimetal strips 40 and 41 will be flexed inwardly so as to disengage the hooked end 47 thereof from engagement with the keeper projection 51. The moment the hooked end 47 is released, the casing section 8 is projected or swung horizontally on its vertical axis and by means of the coil spring 125 to an open position to permit the delivery of the slices of bread B to the user. Simultaneously the pintle shaft 88 will have been rotated so as to swing the switch arm 104 out of engagement with its corresponding stationary contact 98 to thereby break the circuit through the domestic current supply cables 120 and 122 and thereby interrupt the current supply through the lead wires 85 to the electric heating element 77.

If it is desired to toast the bread slices B to a dark brown color, the adjusting screw 52 is manipulated to force the resilient keeper arm 49 inwardly so as to delay the opening of the casing section 8 a longer predetermined time limit. On the other hand, if it is desired to toast the bread to a light brown color, the adjusting screw 52 is unthreaded partially with respect to the nut 53 so as to permit the keeper projection 51 to move slightly forward and thereby shorten the predetermined time interval of the release of said heat responsive latch including the bimetal parts 40 and 41. By thus setting the adjusting screw 52 the casing section 8 may be released when the toasting chamber has reached a predetermined temperature sufficient to cause the flexing of the bimetal strips 40 and 41 and disengagement of the hooked end 47 thereof from the keeper projection 51.

In cleaning the toaster, the section casings 7 and 8 are swung horizontally on their vertical axis to an open position, and a brush or the like is employed for cleaning the heating elements and removing crumbs and the like from the top wall 9 of the base 5. When the casing sections are in their open position, both of the switch arms 103 and 104 will be in the position shown in Figure 7 so as to be disengaged from their respective switch contacts 97 and 98 and insure the interruption of the circuit through the heating elements 77 without necessitating the removal of the plug connector carried by the end of the domestic supply cable 121. In this manner the toaster may be cleaned without the danger of the user being burned or electrocuted by contacting the heating elements 77 or lead wires 85 thereof.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. An automatic electric toaster, comprising a base, a stationary vertical frame thereon, a pair of movable casing sections hinged to said frame to swing horizontally in opposite directions into closing engagement with said frame and form a toasting chamber therebetween, heating elements carried by one of said casing sections and arranged in superposed vertically-spaced relation, and food holders carried by said other casing section and swingable therewith into positions disposed between adjacent heating elements when said sections are in closed engagement with said frame.

2. An automatic electric toaster, comprising a base, a stationary vertical frame thereon, a pair of movable casing sections hinged to said frame to swing horizontally in opposite directions into closing engagement with said frame and form a toasting chamber therebetween, heating elements carried by one of said casing sections and arranged in superposed vertically-spaced relation, food holders carried by said other casing section and swingable therewith into positions disposed between adjacent heating elements when said sections are in closed engagement with said frame, a circuit for supplying electric current to said heating elements, including a pair of switches arranged in series, one switch being connected to each casing section, said switches being closed and opened in response to the closing and opening respectively of said casing sections.

3. An automatic electric toaster, comprising a base, a central frame member extending upwardly from said base, a pair of casing sections hinged to said central frame structure adapted to form a toasting chamber therebetween when said casing sections are closed, heating elements carried by one of said casing sections, rotatable shafts connected to said casing sections, movable switch arms carried by said shafts to rotate therewith upon opening and closing of said casing sections, and a stationary contact engageable with said switch arms in the closed positions of said casing sections, said switch arms being connected in series with said heating elements and a source of electrical energy and operable to interrupt the supply of electrical energy to said heating elements when the casing sections are moved to an open position.

4. An automatic electric toaster, comprising a base, a central frame member extending upwardly from said base, a pair of casing sections hinged to said cental frame structure adapted to form a toasting chamber therebetween when said casing sections are closed, heating elements carried by one of said casing sections, rotatable shafts connected to said casing sections, one of said shafts having a longitudinal bore therethrough, movable switch arms carried by said shafts to rotate therewith upon opening and closing of said casing sections, and a stationary contact engageable with said switch arms in the closed positions of said casing sections, said switch arms being connected in series with said heating elements and a source of electrical energy and operable to interrupt the supply of electrical energy to said heating elements when the casing sections are moved to an open position, said heating elements being connected to said switch arms by a conductor passing through said shaft bore.

OSCAR G. KREER.

REFERENCES CITED

The following references are of record in the file of this patent:

UNITED STATES PATENTS

| Number | Name | Date |
| --- | --- | --- |
| 1,550,949 | Coleman | Aug. 25, 1925 |
| 1,669,318 | Boad | May 8, 1928 |
| 1,769,973 | Wells | July 8, 1930 |
| 1,947,232 | Smith | Feb. 13, 1934 |
| 1,954,235 | Becker et al. | Apr. 10, 1934 |
| 1,993,353 | Young | Mar. 5, 1935 |
| 2,036,523 | Freeman | Apr. 7, 1936 |
| 2,057,741 | Purpura | Oct. 20, 1936 |
| 2,266,024 | Gomersall | Dec. 16, 1941 |
| 2,320,347 | Brosseau et al. | June 1, 1943 |

FOREIGN PATENTS

| Number | Country | Date |
| --- | --- | --- |
| 135,628 | Austria | Nov. 25, 1933 |